United States Patent [19]

Gyugyi

[11] 4,451,777

[45] May 29, 1984

[54] STATIC VAR GENERATION FOR TRANSMISSION LINE COMPENSATION

[75] Inventor: Laszlo Gyugyi, Penn Hills, Pa.

[73] Assignee: Westinghouse Electric Corp., Pittsburgh, Pa.

[21] Appl. No.: 300,842

[22] Filed: Sep. 10, 1981

[51] Int. Cl.³ .............................................. H02J 3/16
[52] U.S. Cl. .................................... 323/210; 322/21; 322/32
[58] Field of Search ..................... 322/7, 8, 21, 29, 32; 323/205, 208–211

[56] References Cited

U.S. PATENT DOCUMENTS

| | | | |
|---|---|---|---|
| 3,999,115 | 12/1976 | South et al. | 322/32 X |
| 3,999,117 | 12/1976 | Gyugyi et al. | 323/211 |
| 4,125,884 | 11/1978 | Sun | 322/32 X |
| 4,156,176 | 5/1979 | Gyugyi et al. | 323/211 |
| 4,302,715 | 11/1981 | Putman et al. | 323/210 |

Primary Examiner—A. D. Pellinen
Attorney, Agent, or Firm—Benjamin Hudson, Jr.

[57] ABSTRACT

There is provided a static VAR generator having voltage regulation in combination with the capability to damp subsynchronous resonance should it occur. A novel method for controlling subsynchronous resonance is provided by monitoring the frequency of the electrical generating system and controlling the insertion of compensating inductance in response to disturbances that may result in voltage and frequency pulsations.

2 Claims, 15 Drawing Figures

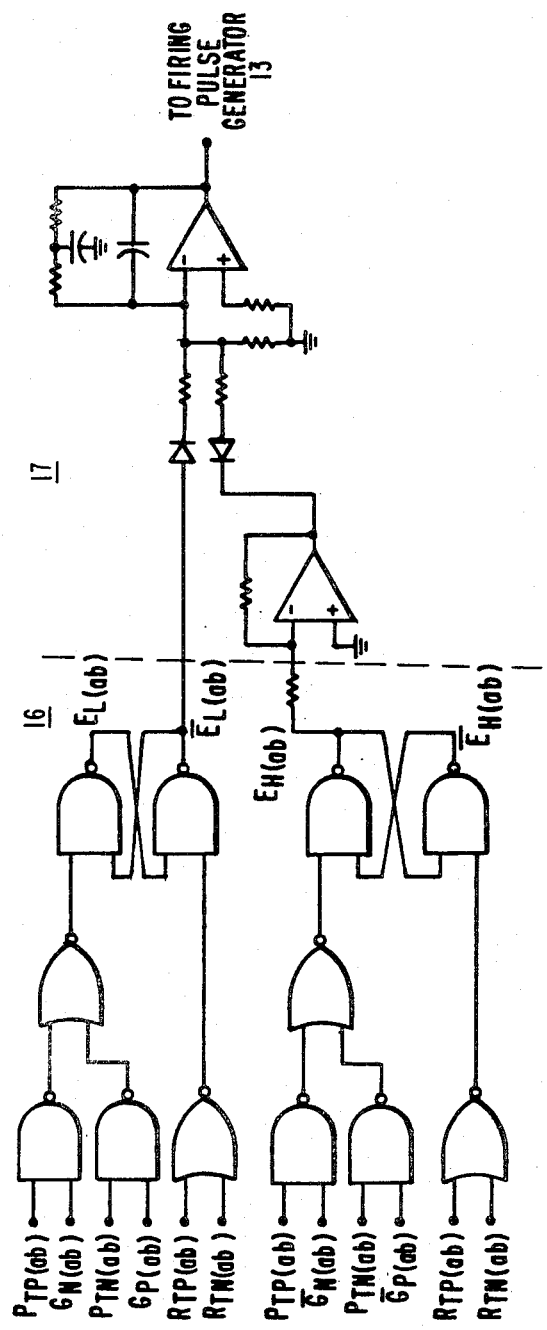
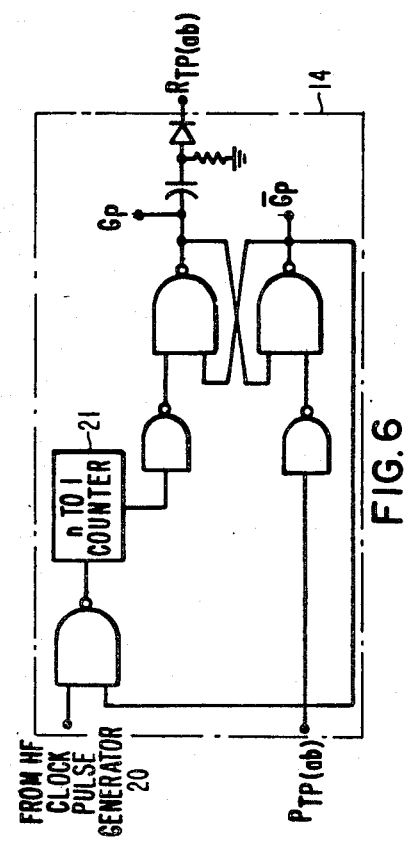
FIG. 7
FIG. 6

STATIC VAR GENERATION FOR TRANSMISSION LINE COMPENSATION

CROSS-REFERENCE TO RELATED APPLICATIONS

This application is related to application Ser. No. 300,841, filed Sept. 10, 1981.

BACKGROUND OF THE INVENTION

1. Field of the Invention

This invention relates generally to means utilized for reducing subsynchronous resonance in synchronous machines and more particularly is related to means for reducing subsynchronous resonance in synchronous machines in combination with providing improved and automatic voltage regulation. 2. Description of the Prior Art In the analysis of power systems stability, it is well known that a synchronous machine connected to an infinite bus will oscillate or "hunt" under certain circuit conditions. In turbine driven generators, periodic variations in the torque applied to the generators cause periodic variations in speed or rotor oscillations. This results in periodic variations in voltage and frequency which are transmitted to the electrical power generating system. These mechanical periodic variations in torque $\omega_M$, (mechanical resonance frequency), produce modulation of the generator voltage which results in small side band components of the nominal electrical frequency, $\omega_\Sigma$. It has been found that when a synchronous machine supplies power to a long transmission line, to which series capacitors are connected for voltage regulation, the resultant line reactance may have a resonant frequency that may match the mechanical resonant frequency, $\omega_M$ that greatly amplifies the rotor oscillations (mechanical resonance frequency) referred to as negative damping. In this case, the lower, or subsynchronous side band component may cause an extremely high current to flow in the electrical system. This high current may feed back magnetically through the air gap of the generator so as to excite further the oscillation of the rotating mechanical apparatus and may cause considerable physical damage such as shaft breakage in the generator.

Although various methods have been proposed for stabilizing an electrical generating system, one of particular interest is the U.S. patent application Ser. No. 048,934, filed June 15, 1979, entitled "Dynamic Parallel Inductive Stabilizer for Synchronous Machines Having Torsional Oscillations" and assigned to the assignee of the present application. In this application, a delta-connected, thyristor-controlled, three-phase reactor bank is employed. The current in the reactor bank is modulated according to the torsional oscillation of the rotating mechanical system using the usual technique of thyristor conduction angle control. The modulating signal used to control the thyristors is derived by measuring the velocity variation of the generator shaft, using some mechanically coupled device, such as a tooth-wheel pick-up.

SUMMARY OF THE INVENTION

There is provided by this invention a static VAR generator means that provides voltage regulation in combination with the capability to damp subsynchronous resonance should it occur. This double utilization of the static VAR generator is clearly advantageous economically goth from the standpoint of initial capital investment and reducing operating losses by providing complete power system stability. A novel means for controlling subsynchronous resonance is provided by monitoring the frequency of the electrical generation system and controlling in response to disturbances caused by changes in load, switching, pulsating driving torque, self-excitation, or other disturbances that may result in voltage and frequency pulsations.

BRIEF DESCRIPTION OF THE DRAWINGS

FIG 6 is a typical schematic diagram of the half period reference generators;

FIG. 7 is a typical schematic block diagram for the error pulse generator and integrator;

DESCRIPTION OF THE PREFERRED EMBODIMENT

Figure 1:
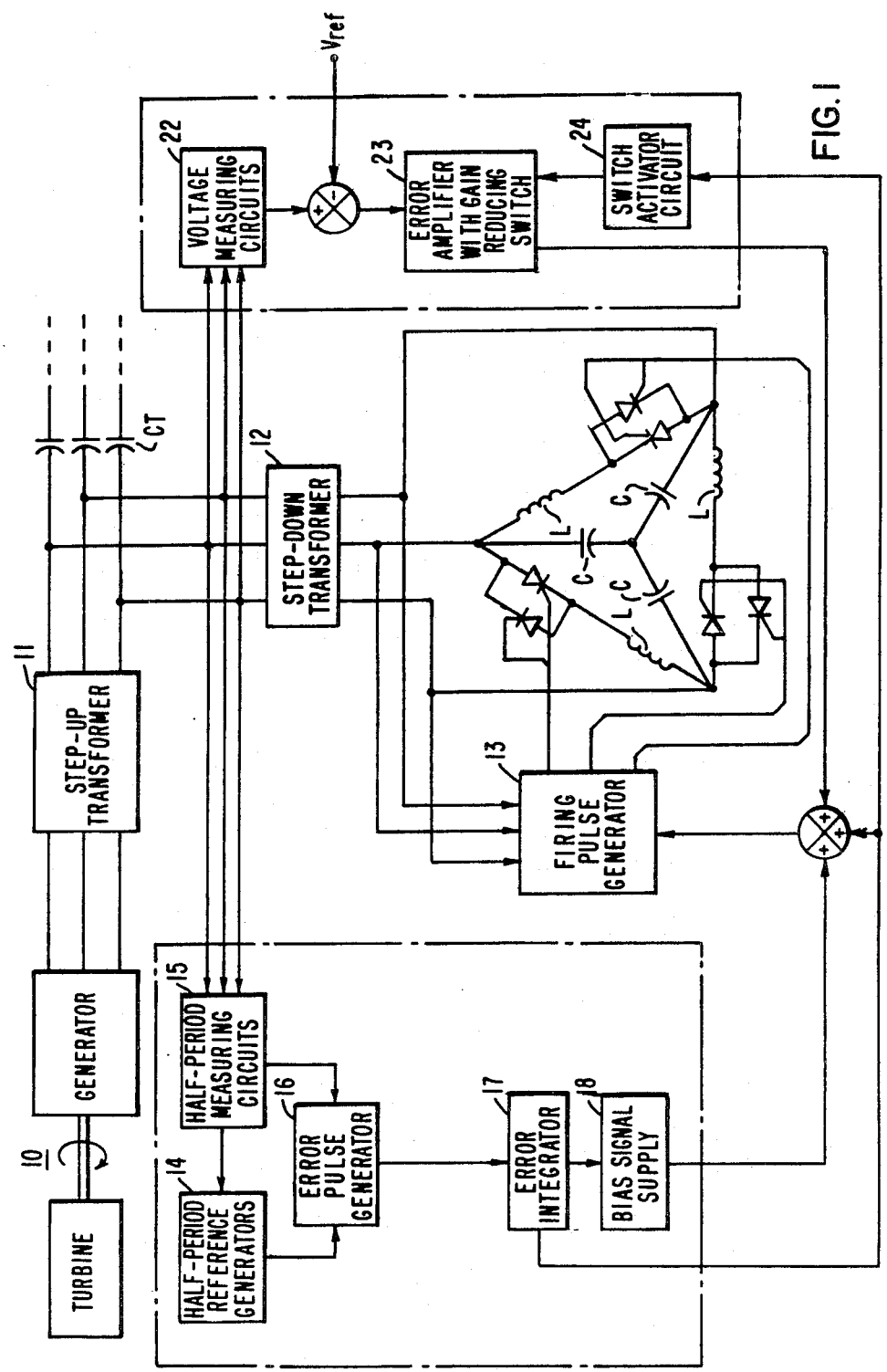
FIG. 1 is a schematic system arrangement for a static VAR generator used for both terminal voltage regulation and damping of subsynchronous resonance.

Referring to FIG. 1, the arrangement of the double purpose VAR generator scheme is shown. THe electrical system comprises a turbine driven AC generator 10 feeding a transmission line via a step-up transformer 11. The receiving end of the transmission line is terminated by an infinite bus that represents the remaining part of the power system. The inductance of the transmission line is partially compensated by a series connected capacitor Ct. At an intermediate terminal of the transmission line, a static VAR generator consisting of a three-phase thyristor-controlled reactor, L, and a three-phase power factor correcting capacitor, C, is connected via a stepdown transformer 12. The current in the reactor, L, is controlled by delaying the firing pulse with respect to the time reference at which the applied AC voltage is maximum. The appropriate delay of the firing pulses, in response to an analog control signal is provided by the firing pulse generator 13. Possible realization of the firing pulse generator is described in U.S. Pat. No. 3,999,117, entitled "Method and Apparatus for Static VAR Generator and Compensator." The control signals that initiate the firing of the pulse generator 13 for subsynchronous resonance are derived by positive and negative half-period measuring circuits 14 and generators 15. An error pulse generator 16 develops an error signal from the two half-period measuring circuits. An error integrator 17 develops a voltage signal proportional to the frequency of the AC network and initiates firing of the pulse generator 13 from a quiescent value determined by the bias signal supply 18.

Figure 8:
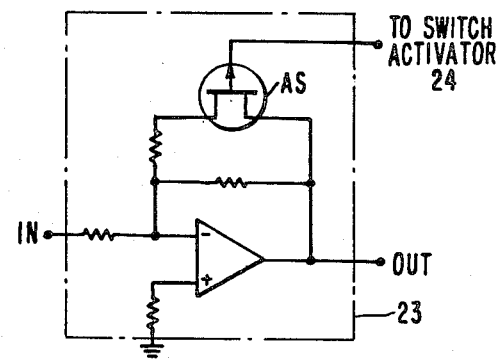
FIG. 8 is the schematic diagram for the error amplifier with analog switch.
Figure 9:
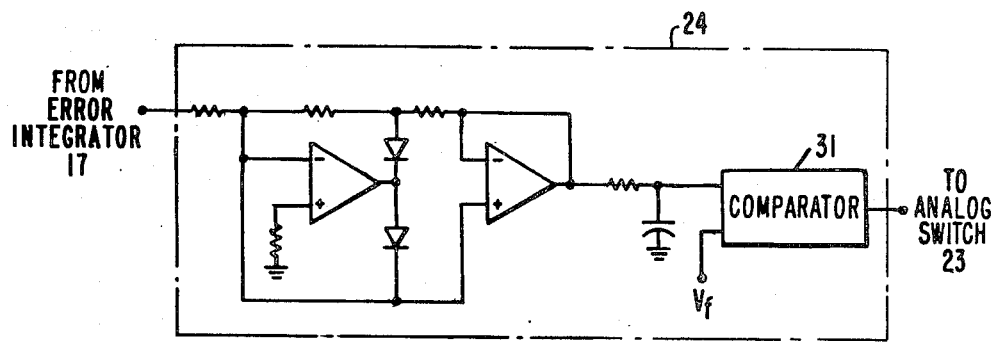
FIG. 9 is the schematic diagram for the switch activating circuit.

At the right-hand side of FIG. 1, is shown schematically the control arrangement used to regulate the terminal voltage. This follows the well-established technique described in U.S. Pat. No. 4,156,176, "Controlling Static VAR Generators for Network Terminal Voltage Regulation," of generating an error-signal from the difference of the measured terminal voltage as determined by the voltage measuring circuits 22 and a reference voltage, then amplifying appropriately this error by the error amplifier 23 feeding the firing pulse generator 13. In the proposed arrangement, the error amplifier is compensated with an electronic analog switch shunting the output to input feedback resistor, as illustrated in FIG. 8. When the switch is open the error amplifier has the normal gain needed to regulate the terminal voltage. When the switch is closed the gain of the amplifier is greatly reduced and thus the output current of the VAR generator will not respond significantly to the level, or variation of the terminal voltage. The electronic switch is driven by a switch activator circuit 24 which compares the rectified and filtered value of an input signal to a reference level by comparator 31, as illustrated in FIG. 9. Whenever the reference level is exceeded the switch activator circuit closes the electronic switch, thereby reducing the gain of the error amplifier 23.

Figure 2:
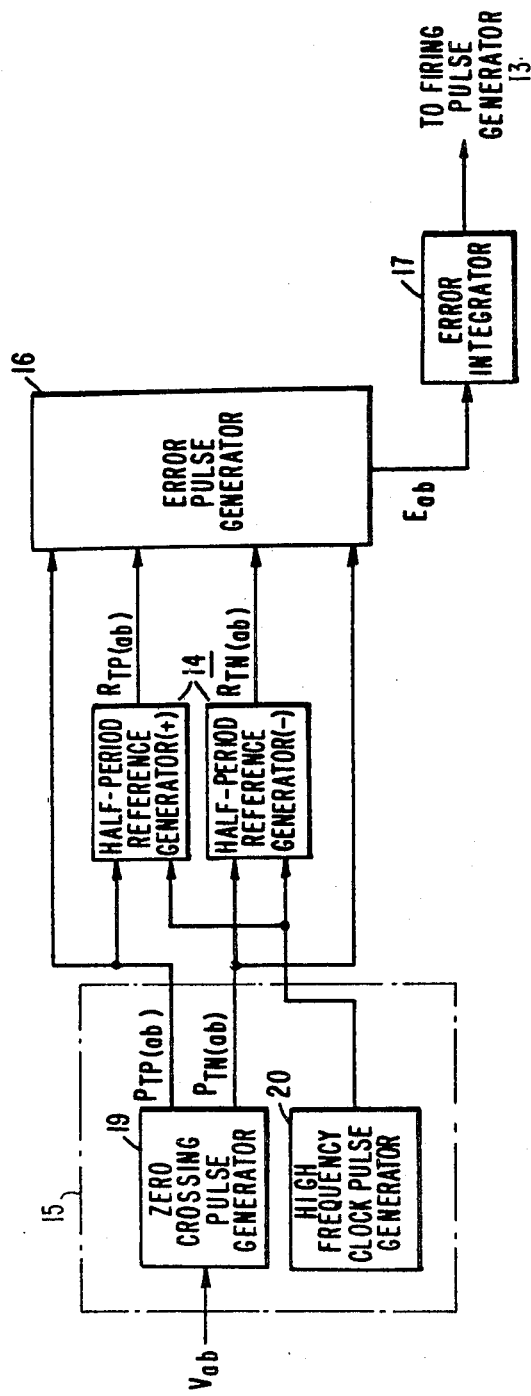
FIG. 2 is a block diagram of the control arrangement for subsynchronous resonance dampening.
Figure 3A:
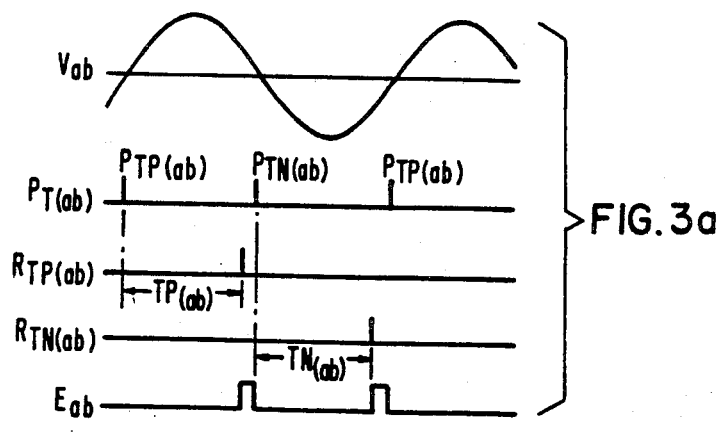
FIGS. 3A-3D are waveforms illustrating the operation of the proposed controls shown in FIG. 2 at frequencies lower than the nominal frequency.
Figure 3B:
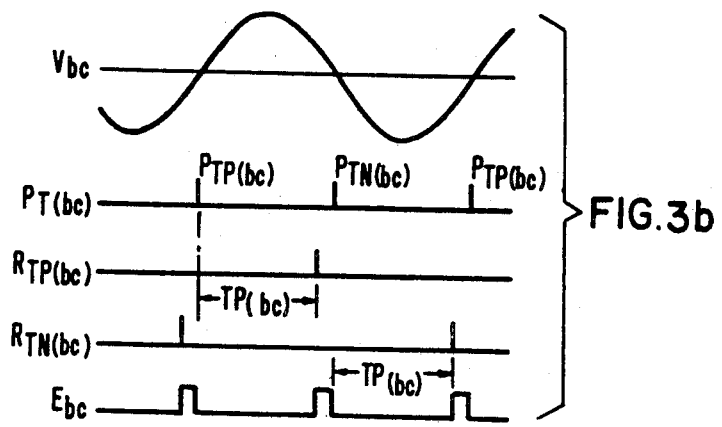
Figure 3C:
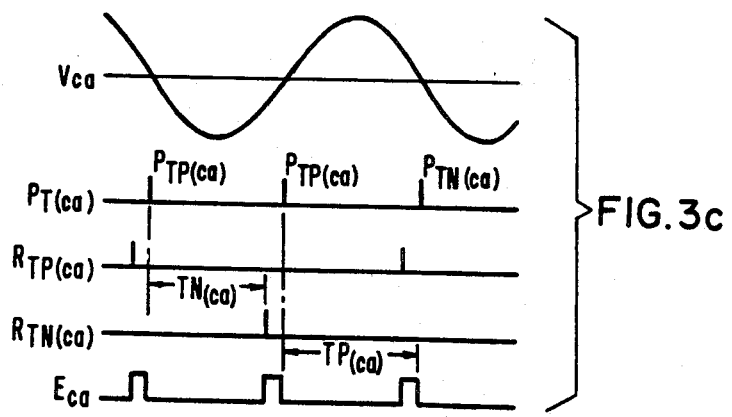
Figure 3D:
Figure 4A:
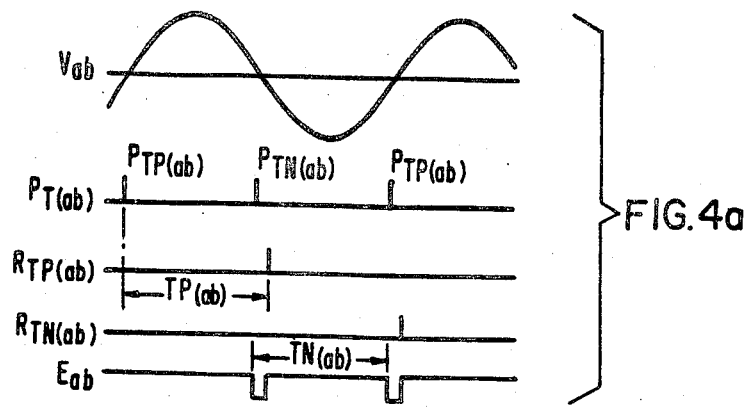
FIGS. 4A-4D are waveforms illustrating the operation of the proposed controls shown in FIG. 2 at frequencies higher than the nominal frequency.
Figure 4B:
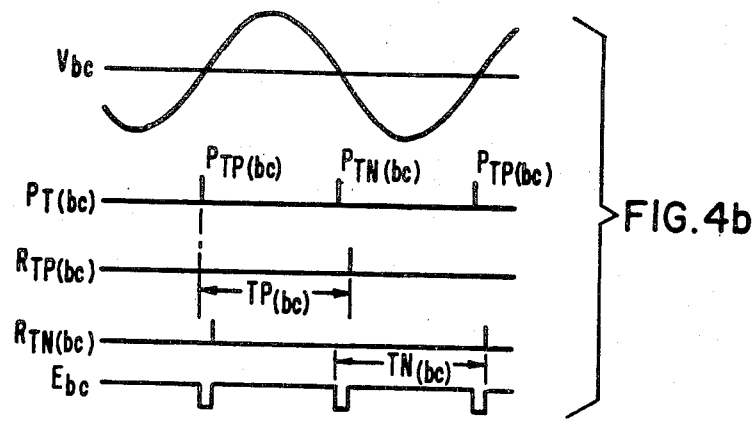
Figure 4C:
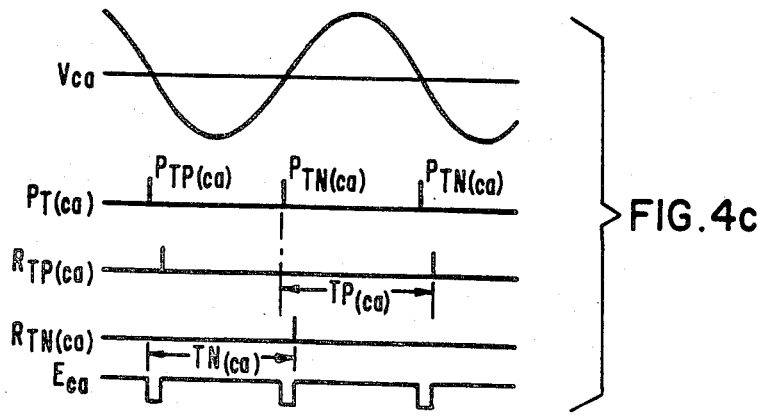
Figure 4D:

At the left-hand side of FIG. 1 is shown schematically the control arrangement to damp subsynchronous resonance. The basic idea is to measure the half cycle period times of each of the three terminal voltages and compare these to a reference half cycle period time corresponding to the unmodulated 60 Hz. terminal voltage. Referring to FIGS. 2, 3 and 4 there is shown at the zero crossings of the terminal voltage, Vab, Vbc, Vca, pulses $P_{TP(ab)}$ (positive going zero crossing and), $P_{TN(ab)}$ (negative-zero crossings and), $P_{TP(bc)}$ and $P_{TN(bc)}$ and $P_{TP(ca)}$ and, $P_{TN(ca)}$ or, respectively, produce by zero crossing pulse generator 19. Each zero crossing pulse initiates the generation of the reference half periods, $TP_{(ab)}$ and $TN_{(ab)}$, $TP_{(bC)}$ and $TN_{(bC)}$, $TP_{(Ca)}$ and $TN(Ca)$, each of which is derived from a precision high-frequency clock pulse generator 20 shown in FIG.2. The half period reference generator produces pulses $R_{TP(ab)}$ and $R_{TN(ab)}$, and $R_{TP(bC)}$ and $R_{TN(bC)}$, $R_{TP(Ca)}$ and $R_{TN(Ca)}$. The time difference between the reference half periods and the actual ones marked by the pulses $R_{TP(ab)}$, $P_{TN(ab)}$, and $R_{TN(ab)}$, $P_{TP(ab)}$, $R_{TP(bC)}$, $P_{TN(bC)}$, and $R_{TN(bC)}$, $P_{TP(bC)}$, $R_{TP(Ca)}$, $P_{TN(Ca)}$, $R_{TN(Ca)}$ and $P_{TP(Ca)}$ is the time error representing the variation of the steady state period time. This time difference or time error for a three terminal voltage is represented by pulses $E_{ab}$, $E_{bC}$, and $E_{Ca}$ of constant magnitude and a polarity that indicates whether the actual half period time is longer, that is the generator frequency is lower (positive polarity) or shorter, that is the generator frequency is higher (negative polarity), than the reference half period as illustrated in FIGS. 3 and 4. By integrating these error pulses, a voltage proportional to the frequency (and rotor velocity) change is obtained. As illustrated in FIG. 1, this voltage can be used to modulate the firing delay of the thyristor from a quiescent value (determined by the output voltage level of the bias signal supply) and thereby insert effective inductance to damp subsynchronous resonance.

Figure 5:
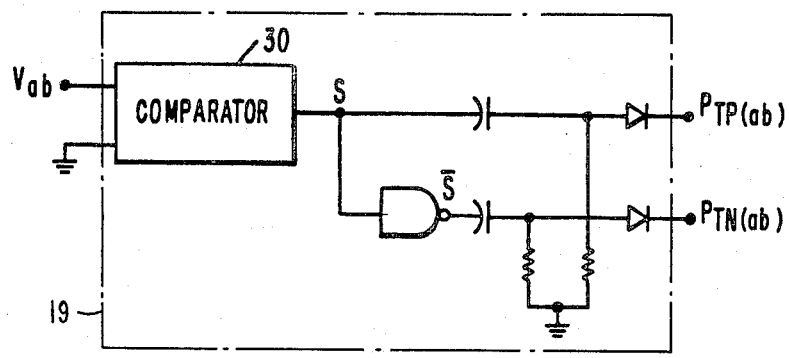
FIG. 5 is a typical schematic diagram of the zero crossing pulse generator.

The operation of the proposed control scheme is further explained by the more detailed functional diagrams in operating waveforms shown in FIGS. 5, 6 and 7. FIG. 5 illustrates for phase AB the derivation of the pulses $P_{TP(AB)}$ and $P_{TN(AB)}$ at the positive-going and, respectively the negative-going zero crossings of the terminal voltage Vab utilizing comparator 30 as shown.

FIG. 6 illustrates the derivation of the reference half period, $TP_{(aB)}$, and the corresponding pulse, $R_{TP(aB)}$, using the high frequency clock pulse generator 20 and a gated counter 21. The gate of the counter is opened by the zero crossing pulse $P_{TP(aB)}$ and pulses of the high frequency clock pulse generator 20, appearing at precisely defined time intervals (for example, at every 1/20,000 interval of the half-period corresponding to 60 Hz.), are counted. When the count reaches the number corresponding to the reference half period (in the example used, 12,000), the last pulse closes the gate, and the counter stops until the next $P_{TP(ab)}$ pulse restarts the process again.

FIG. 7 illustrates a possible logic arrangement to derive the polarized error pulses representing the time difference between the reference half period and the measured one. The derivation of the error integral is also shown. The error integral is provided as an analog voltage signal, whose magnitude and polarity follows precisely the frequency variation of the terminal voltage. The high frequency clock pulse generator 20 can be a precision crystal oscillator oscillating at some multiple of the 60 Hz. generator frequency (for example, at $2 \times 12,000 \times 60 = 1.44$ MHz). Because of the different steady-state accuracy between a frequency regulator of the generator and the crystal oscillator, a constant steady-state error may develop. To prevent the integrator from responding to slow or responding to steady-state (dC) error, its dc gain has to be reduced. This can be accomplished, for example, by the simple T-network consisting of a capacitor and two resistors, connected across the integrator's capacitors, as illustrated in FIG. 7A. The high frequency clock pulse generator 20 can also be realized by a phase-locked loop incorporating a high frequency voltage controlled oscillator. Making the response of the phase-locked loop rather slow, the frequency of the voltage controlled oscillator will correspond to the main frequency of the generator voltage and will not follow the subsynchronous modulation caused by the torsional oscillation. Since the frequency of the voltage controlled oscillator in the phase-lock loop represent the exact multiple of the steady-state generator frequency, the previously described dC gain reduction for the error integrator is not necessary.

From the foregoing, it is readily seen that there is described a means to damp subsynchronous resonance without directly measuring the shaft velocity change of the generator. A novel method is devised to measure, with a negligible time delay, the frequency variation of the terminal voltage, and to generate a corresponding signal to modulate the conduction angles of the thyristor in the VAR generator.

Although there have been illustrated and described a specific embodiment, it is clearly understood that the same were merely for purposes of illustration and that changes and modifications may be readily made therein by those skilled in the art without departing from the spirit and scope of this invention.

I claim:

1. A static VAR generator and network stabilizer, comprising:
   (a) a reactance means disposed for connection into an AC network;
   (b) a VAR monitoring means for monitoring the reactive requirements of said AC network;
   (c) a frequency monitoring means for measuring the period of the network voltage cycle and comparing it to the period of a reference voltage cycle to detect subsynchronous resonance in said AC network;
(d) a control means connected to said reactance means and said VAR monitoring means for connection of said reactance means into said AC network in response to the reactive requirements of said AC network; and
(e) said control means connected to said reactance means and said frequency monitoring means for connection of said reactance means into said AC network to dampen subsynchronous resonance in said AC network.

2. A static VAR generator and network stabilizer as recited in claim 1 wherein said frequency monitoring means is further comprised of:
(a) a network voltage frequency pulse generator disposed to generate pulses representing the period of the network voltage cycle;
(b) a high frequency reference clock pulse generator disposed to generate pulses representing the period of an unmodulated reference terminal voltage for comparison with the AC network voltage;
(c) an error pulse generator responsive to deviations in the signals of the network voltage frequency pulse generator and the signals of the high frequency reference clock pulse generator;
(d) an error pulse integrator responsive to the output of the error pulse generator disposed to produce a voltage proportional to the diviations of frequency between the network voltage frequency pulse generator and the high frequency reference clock pulse generator representing subsynchronous resonance;
(e) a firing pulse generator responsive to said error pulse integrator to modulate firing delays of thyristors disposed to insert said reactance means to dampen said subsynchronous resonance.

* * * * *